(12) United States Patent
Bi et al.

(10) Patent No.: US 8,245,001 B2
(45) Date of Patent: Aug. 14, 2012

(54) STORAGE DEVICE AND METHOD FOR PROTECTING ITS PARTITION

(75) Inventors: Hongjang Bi, Beijing (CN); Weixian Guo, Beijing (CN); Gang Ding, Beijing (CN); Zonghong Zhang, Beijing (CN); Fei Wang, Beijing (CN); Maolin Huang, Beijing (CN)

(73) Assignees: Legend Holdings Ltd, Beijing (CN); Lenovo (Beijing) Limited, Beijing (CN)

( * ) Notice: Subject to any disclaimer, the term of this patent is extended or adjusted under 35 U.S.C. 154(b) by 548 days.

(21) Appl. No.: 12/049,526

(22) Filed: Mar. 17, 2008

(65) Prior Publication Data

US 2008/0235483 A1 Sep. 25, 2008

(30) Foreign Application Priority Data

Mar. 20, 2007 (CN) .......................... 2007 1 0064567

(51) Int. Cl.
*G06F 12/00* (2006.01)
*G06F 13/00* (2006.01)
*G06F 13/28* (2006.01)
(52) U.S. Cl. ........................ 711/163; 711/173
(58) Field of Classification Search .................. 711/173, 711/163
See application file for complete search history.

(56) References Cited

U.S. PATENT DOCUMENTS 5,649,212 A * 7/1997 Kawamura et al. ........... 713/324
6,356,941 B1 3/2002 Cohen
6,636,871 B1 * 10/2003 Rafanello et al. ...................... 1/1
7,376,821 B2 * 5/2008 Stephan et al. ................... 713/1
2003/0177329 A1 * 9/2003 Larvoire et al. ............... 711/173
2006/0294298 A1 12/2006 Peterson et al.

FOREIGN PATENT DOCUMENTS

CN 1783037 A 6/2006

OTHER PUBLICATIONS

Brouwer, Andries. Partitoin types: list of partition identifiers for PCs. Feb. 9, 2006. Available at: http://web.archive.org/web/20060209013317/http://www.win.tue.nl/~aeb/partitions/partition_types-1.html.*
Sedory, Daniel. MBR/EBR Partition Tables. Jul. 22, 2007. Available at: http://thestarman.pcministry.com/asm/mbr/PartTables2.htm#ebr.*
Wikipedia, Comparison of File Systems, Feb. 18, 2006, Available at: http://web.archive.org/web/20060218194221/http://en.wikipedia.org/w/index.php?title=Comparison_of_file_systems.*
Hughes, James, Architecture of the Secure File System, Oct. 23, 2000, Available at: http://web.archive.org/web/20000815081452/http://www.cs.auckland.ac.nz/~pgut001/sfs/.*

* cited by examiner

*Primary Examiner* — Jared Rutz
*Assistant Examiner* — Ryan Bertram
(74) *Attorney, Agent, or Firm* — Dickstein Shapiro LLP

(57) ABSTRACT

The present invention provides a storage device and a method for protecting its protected partition in which the storage device comprises a master boot record unit and a protected partition, the protected partition comprises an application data area and a system data area for storing application data and system data to be provided to a user, respectively, and the system data area is in a customized data format of nonstandard file system. With the storage device and the method for protecting its protected partition, security of system data in the protected partition of the storage device is enhanced.

17 Claims, 2 Drawing Sheets

STORAGE DEVICE AND METHOD FOR PROTECTING ITS PARTITION

BACKGROUND OF THE INVENTION

1. Field of Invention

The present invention relates to the field of computer, and in particular to a storage device and a method for protecting its partitions.

2. Description of Prior Art

Currently, the application of the computer has prevailed in our daily life. In order to provide difference and added value, various personal computer (PC) manufactures offer for users various functional software which is generally divided into application software and system software. Application software usually contains drive programs, while system software can be Pre-Boot system software which can be started to carry out such functions as salvation and restoration of the primary operating system before the execution of the primary operating system, such as Windows. Most of the functional software is initially provided in the form of a disk. With the expansion of storage device space, a partition on a storage device can be reserved to store the functional software, and such partition should be protected as well as possible from being damaged by a user.

At present, there are mainly two protection schemes for implementing the protection on the partition.

1. HPA Partition Protection Scheme

Host Protect Area (HPA) is a harddisk high-end area which is protected by utilizing SetMax instruction in the ATA specification. This scheme sets the size of the HPA partition through two ATA instructions of SetMax and Read Native Max Address so that the HPA partition is normally invisible to DOS and Windows platforms and, when in the protected status, even cannot be read by Mainboard Basic Input Output System (BIOS), for the purpose of protecting the data in the HPA partition. For example, if 10 G of a harddisk with capacity of 80 G is set as HPA partition, only the capacity of 70 G can be detected by BIOS.

This above scheme, however, has the following drawbacks:

(1) there is a problem with compatibility between the HPA partition and the harddisk, and thus stability is relatively poor;

(2) there is no file system in the HPA partition, so it is difficult to parse and maintain data, and a great effort is required to develop and maintain production tools;

(3) the harddisk data known to users differ from the actual data, and sometimes there exists a gap of several GBs, which leads to the increase in after-sale cost.

2. Type 12 Partition Protection Scheme

This scheme is to set the protected partition on a harddisk as Type 12 partition which is not loaded after the startup of the Windows OS, Microsoft. Therefore, a user can only view the partition in "disk management" but cannot perform any function, such as formatting and deletion, on it, except the operation of "Help". In this way, the goal of protecting the data in Type 12 partition is achieved.

Unfortunately, the above scheme has disadvantages in that, since the presence of system data and application data in the Type 12 partition is based on a file system (e.g., standard file system FAT32 or NTFS, etc.), security is weakened when the Type 12 partition is mounted as a disk label by the user and subjected to data reading/writing or it is damaged by the user with a third-party disk tool.

SUMMARY OF THE INVENTION

The object of the present invention is to provide a storage device, with which the security for system data and/or application data in a protected partition on the storage device is strengthened.

Another object of the present invention is to provide a method for protecting a protected partition on a storage device, with which the security for system data and/or application data in a protected partition on the storage device is strengthened.

The present invention has various benefits. According to the storage device and the method for protecting its protected partition of the present invention, the protected partition is divided into an application data area and a system data area, and the system data and/or the application data are stored in the system data area in a customized data format of nonstandard file system, so that the security of the system data can be guaranteed when the user mounts the protected partition as a disk label and performs data reading/writing on it. Besides, the system data area is divided into multiple subpartition for storing different types of system data respectively, and a partition boot record PA_MBR is arranged in the system data area to facilitate parsing and maintenance of the system data. Further, since the size of the protected partition recorded in the master boot record MBR of the storage device equals to the sum of the sizes of the application data area and the system data area, the data of the storage device visible to the user coincides with the actual data.

DETAILED DESCRIPTION OF PREFERRED EMBODIMENTS

Below, the storage device and the method for protecting its protected partition will be described in detail by example of harddisk with reference to FIGS. 1-4.

Figure 1:
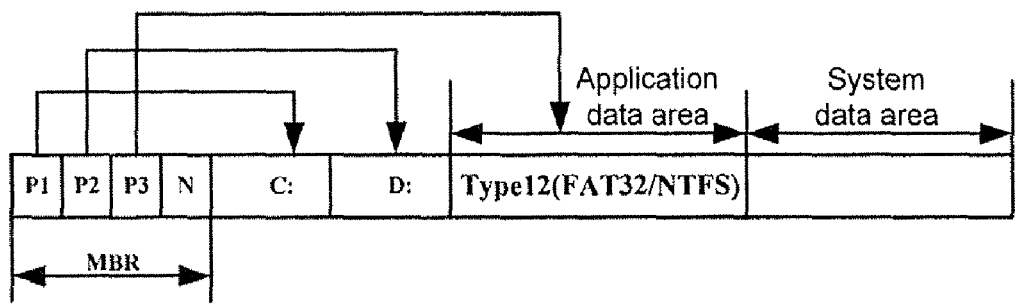
FIG. 1 is a schematic diagram of the physical structure of a storage device according to the present invention.

As shown in FIG. 1 which is a schematic diagram of the physical structure of a harddisk according to the present invention, the harddisk includes a master boot record (MBR) unit, general partitions (e.g., C disk partition, D disk partition) and a protected partition. The protected partition consists of an application data area and a system data area for storing application data and system data to be provided to a user, and the MBR unit is adapted to record the start position and size of the application data area as well as to set the partition type of the application data area as type 0x12.

The application data area is present in the form of standard file system FAT32 or NTFS, while the system data exist in a customized data format of nonstandard file system. There is a standard definition for each partition type, for example, type 0x0C for FAT32, type 0x07 for NTFS, and type 0x12 for Type 12. The above customized data format includes a customized member variable and its type.

Figure 2:
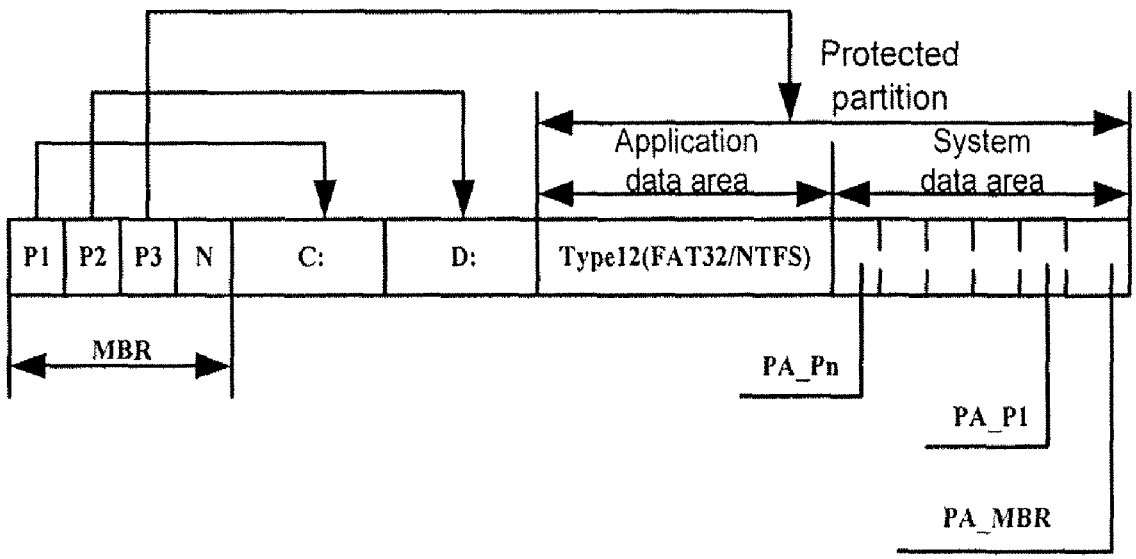
FIG. 2 is a schematic diagram of the physical structure of a storage device according to the preferred embodiment of the present invention.

As shown in FIG. 2, a partition boot record (PA_MBR) and multiple subpartitions (PA_P1~PA_Pn) are preferably arranged in the system data area on the present inventive storage device. Each of the subpartitions is configured to store all types of system data to be provided to the user (e.g., system restoration, virus clearance, file backup, program drive and the like). The partition boot record PA_MBR is configured to record the position and size of each subpartition as well as the type of respective system data stored in each subpartition. Moreover, the MBR unit further expands the recorded size of the application data area to the sum of the sizes of the application data area and the system data area, in order to protect the system data area.

On the basis of the above description, the information on all types of system data in the system data area is determined in the partition boot record PA_MBR, respective types of system data can thus be found by parsing the partition boot record PA_MBR and corresponding functions (e.g., system restoration, virus clearance, file backup, program drive, and automatic installation) can be further effectuated. In a specific implementation, the PA_MBR can be defined as:

```
Typedef struct _PA_MBR {
    unsigned char    BootID;    //BootID denotes coding
information on user's keystroke during BIOS POST
    unsigned char    SysID;    //SysID denotes system type,
there are different systems (e.g., linux, DOS, WinPE) in the system
partition
    unsigned short   TypeID;    //TypeID denotes partition ID
    unsigned long    Reserved;  //reserved for further extension
    unsigned long    Pos;       //Pos denotes the start position of
partition
    unsigned long    Size;      //Size denotes the size of partition
}PA_MBR, *pPA_MBR;
```

TypeID represents the partition ID for distinguishing different partitions, and the value of Pos represents the offset from the end of a disk for easier use.

Figure 3:
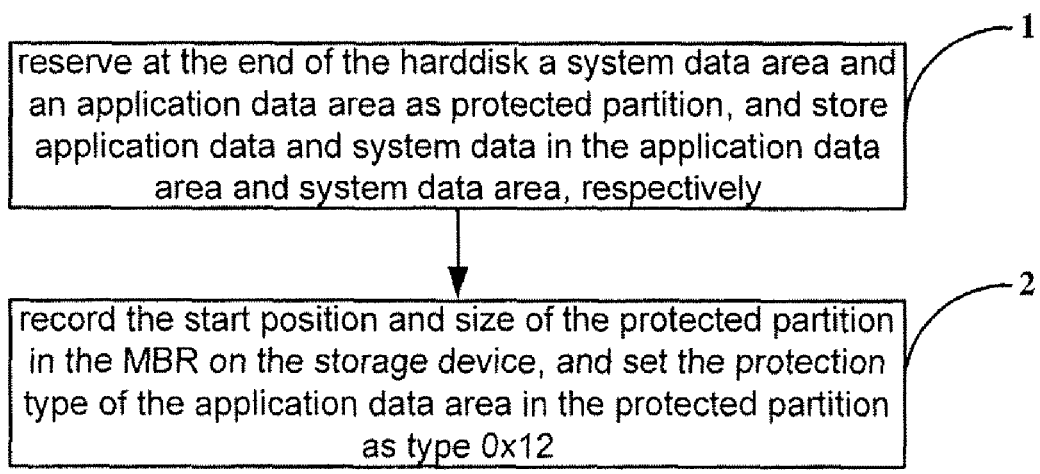
FIG. 3 is a flowchart of a method for protecting a protected partition on the storage device according to the present invention.

Now, take harddisk as an example, a concrete description will be given to the method for protecting a protected partition according to the present invention, which comprises the following steps as shown in FIG. 3.

At step 1, the system data area and the application data area are reserved as the protected partition at the end of the harddisk, and the application data to be provided to the user and the system data present in a customized data format of nonstandard file system are stored into the application data area and the system data area, respectively; the application data area can be present in a form of standard file system FAT32 or NTFS.

At step 2, the start position and size of the protected partition are recorded in the MBR on the storage device, and the protection type of the application data area in the protected partition is set as type 0x12.

The purpose of setting the protection type of the application data area as type 0x12 is to make the application data area a Type 12 partition. There is a standard definition for each partition type, for example, type 0x0C for FAT32, type 0x07 for NTFS, and type 0x12 for Type 12. Further, if the type of the application partition is type 0x0C, it is necessary to modify the type into type 0x12.

Meanwhile, the step 1 can further comprise the steps of dividing the system data area into multiple subpartitions for storing different types of system data, respectively; storing PA_MBR in the system data area; recording in the PA_MBR the position and size of each subpartition as well as the type of system data stored in the subpartition.

In a specific implementation, the PA_MBR can be defined as:

```
Typedef struct _PA_MBR {
    unsigned char    BootID;    //BootID denotes coding
information on user's keystroke during BIOS POST
    unsigned char    SysID;    //SysID denotes system type,
```

-continued

```
there are different systems (e.g., linux, DOS, WinPE) in the system
partition
    unsigned short   TypeID;    //TypeID denotes partition ID
    unsigned long    Reserved;  //reserved for further extension
    unsigned long    Pos;       //Pos denotes the start position of
partition
    unsigned long    Size;      //Size denotes the size of partition
}PA_MBR, *pPA_MBR;
```

TypeID represents the partition ID for distinguishing different partitions, and the value of Pos represents the offset from the end of a disk for easier use.

Such step can be further added after the step 2 as expanding the size of the application data area recorded in the MBR unit to the sum of the sizes of the application data area and the system data area so that it has a coverage up to the end of the storage device.

Figure 4:
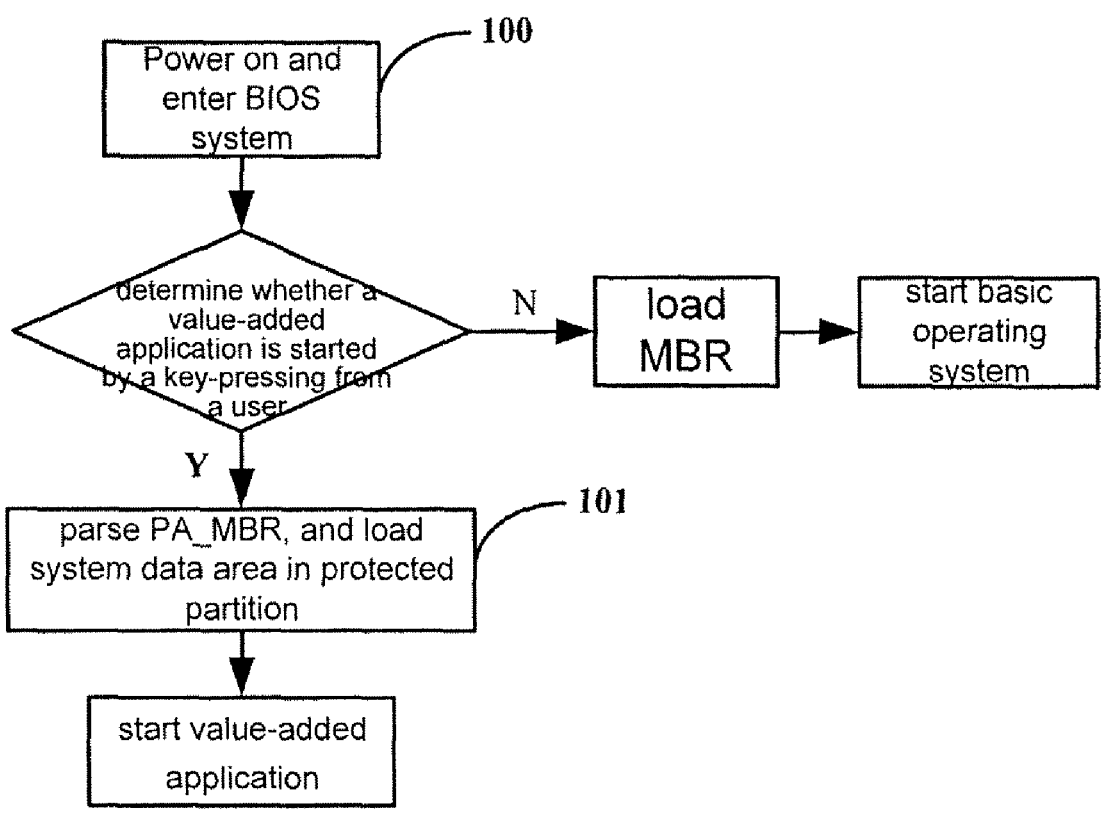
FIG. 4 is an operation flowchart of the present invention when actually applied.

Hereafter, the operation flowchart of the present invention when actually applied is described, as shown in FIG. 4, comprising the following steps:

Step 100: after powering on the computer and entering BIOS, determining whether a predefined flag is detected (e.g., the user has pressed a preset function key to initiate a value-added application), and proceeding to step 101 if it is, otherwise loading the MBR and starting the primary operating system (e.g., Windows OS);

Step 101: parsing the PA_MBR, and loading the system data in the corresponding subpartition based on the parsing result so as to initiate a corresponding function (e.g., system restoration, virus clearance, file backup, program drive, and automatic installation).

Further, the step of deciding whether to load the application data area as needed can be added to the end of loading the system data in the corresponding subpartition based on the parsing result.

While the present invention is explained with the example in which the protected partition is located at the end of the storage device, the present invention is not limited to this, and the protected partition can be located at any other position in the storage device.

Also, the storage device of the present invention has been illustrated by example of harddisk, but the present invention is not limited to this, and the storage device can comprise flash memory, USB harddisk, etc.

It should be noted that, although the system data is protected by storing the system data in the system data area in a customized data format of nonstandard file system as mentioned above, the application data can also be protected by storing the application data in the application data area in a customized data format of nonstandard file system. Similarly to the protection of the system data, the boot record PBR in the application data area can be defined in a specific implementation as:

```
Typedef struct _PBR {
    unsigned char    BootID;    //BootID denotes coding
information on user's keystroke during BIOS POST
    unsigned char    SysID;    //SysID denotes system type,
there are different systems (e.g., linux, DOS, WinPE) in the system
partition
    unsigned short   TypeID;    //TypeID denotes partition ID
    unsigned long    Reserved;  //reserved for further extension
    unsigned long    Pos;       //Pos denotes the start position of
partition
```

-continued

```
unsigned long    Size;    //Size denotes the size of partition
}PBR, *pPBR;
```

After the user enters the BIOS system, application data can be parsed as needed, and then corresponding application data can be loaded.

In summery, according to the storage device and the method for protecting its protected partition of the present invention, by dividing the protected partition into an application data area and a system data area, the system data are saved in the system data area in a customized data format of nonstandard file system, with the file system being maintained. Therefore, even if the user mounts this partition as a disk label utilizing a third-party tool, only the application data area can be used, which prevents the system data area from being damaged and ensures the security and integrity of the system data. Besides, it is convenient to parse and maintain the system data, since the system data area is divided into a number of subpartitions for storing different type of system data, and the partition boot record PA_MBR is provided in the system data area. Further, since the size of the protected partition recorded in the master boot record MBR of the storage device equals to the sum of the sizes of the application data area and the system data area, the data of the storage device visible to the user coincides with the actual data.

The foregoing detailed description of the present invention is intended to give a better understanding of the present invention to those skilled in the art. It shall be appreciated, however, that any change or modification can be made within the scope encompassed by the claims of the present invention, and such change or modification should be within the scope of the invention.

What is claimed is:

1. A storage device comprising a master boot record unit and a protected partition, wherein:
    said protected partition comprises an application data area and a system data area for storing application data and system data to be provided to a user, respectively, wherein data having a customized format of nonstandard file system are stored into said application data area and/or said system data area, and wherein the nonstandard file system is configured to prevent said application data area and/or said system data area from being damaged by the user when the user mounts the protected partition as a disk label, and
    a partition boot record PA_MBR and a plurality of subpartitions are included in said system data area, wherein said plurality of subpartitions are configured to stored different types of system data to be provided to the user, and wherein said partition boot record is configured to record the position and size of each subpartition as well as the type of corresponding system data stored in the subpartition.

2. The storage device of claim 1, wherein the type of said application data area is type 0x12.

3. The storage device of claim 1, wherein said customized data format includes a customized member variable and its type.

4. The storage device of claim 1, wherein said master boot record unit is configured to record the start position and size of the application data area in said protected partition, or to record the sum of the sizes of said application data area and said system data area.

5. The storage device of claim 1, wherein said protected partition is located at the end of the storage device.

6. A method for protecting a protected partition of a storage device, wherein the method comprises:
    step a of reserving in the storage device a system data area and an application data area as the protected partition;
    step b of storing data having a customized format of nonstandard file system into said application data area and/or said system data area, wherein the nonstandard file system is configured to prevent said application data area and/or said system data area from being damaged by the user when the user mounts the protected partition as a disk label; and
    step c of dividing said system data area into a plurality of subpartitions for storing different types of system data to be provided to a user, storing a partition boot record PA_MBR in said system data area, and recording the position and size of each subpartition as well as the type of corresponding system data stored in the subpartition in said partition boot record PA_MBR.

7. The method for protecting a protected partition of a storage device of claim 6 wherein the method further comprises:
    setting the protection type of the application data area in said protected partition as type 0x12 in a master boot record unit MBR of the storage device.

8. The method for protecting a protected partition of a storage device of claim 6 wherein said customized data format includes a customized member variable and its type.

9. The method for protecting a protected partition of a storage device of claim 6 wherein said step a further comprises:
    recording the size of said application data area or the sum of the sizes of said application data area and said system data area in the master boot record unit.

10. The method for protecting a protected partition of a storage device of claim 6 wherein, in said step a, reserving said protected partition at the end of the storage device.

11. The storage device of claim 2, wherein said customized data format includes a customized member variable and its type.

12. The storage device of claim 2, wherein a partition boot record PA_MBR and a plurality of subpartitions are included in said system data area, wherein
    said plurality of subpartitions are configured to stored different types of system data to be provided to the user; said partition boot record is configured to record the position and size of each subpartition
    as well as the type of corresponding system data stored in the subpartition.

13. The storage device of claim 2, wherein said master boot record unit is configured to record the start position and size of the application data area in said protected partition, or to record the sum of the sizes of said application data area and said system data area.

14. The storage device of claim 2, wherein said protected partition is located at the end of the storage device.

15. The method for protecting a protected partition of a storage device of claim 7 wherein said step a further comprises:
    dividing said system data area into a plurality of subpartitions for storing different types of system data to be provided to a user, storing a partition boot record PA_MBR in said system data area, and recording the position and size of each subpartition as well as the type of corresponding system data stored in the subpartition in said partition boot record PA_MBR.

16. The method for protecting a protected partition of a storage device of claim 7 wherein said step a further comprises:
   recording the size of said application data area or the sum of the sizes of said application data area and said system data area in the master boot record unit.

17. The method for protecting a protected partition of a storage device of claim wherein, in said step a, reserving said protected partition at the end of the storage device.

* * * * *